(12) United States Patent
Zubik

(10) Patent No.: US 6,308,588 B1
(45) Date of Patent: Oct. 30, 2001

(54) ANGLE DRIVE HAVING AN INTEGRATED COUPLING WITH ROTATIONAL PLAY

(75) Inventor: John Zubik, Lockport, IL (US)

(73) Assignee: GKN Walterscheid GmbH, Lohmar (DE)

( * ) Notice: Subject to any disclaimer, the term of this patent is extended or adjusted under 35 U.S.C. 154(b) by 0 days.

(21) Appl. No.: 09/392,680

(22) Filed: Sep. 9, 1999

(51) Int. Cl.[7] .................................................. F16H 1/14
(52) U.S. Cl. ......................... 74/417; 74/606 R; 464/160
(58) Field of Search .............................. 74/416, 417, 423, 74/424, 606 R, 89.13; 464/160

(56) References Cited

U.S. PATENT DOCUMENTS

| | | | |
|---|---|---|---|
| 1,432,954 | * | 10/1922 | Berthold ................................ 464/160 |
| 2,500,723 | * | 3/1950 | Ware ...................................... 74/411 |
| 3,809,932 | * | 5/1974 | Erwin ..................................... 310/41 |
| 4,759,192 | * | 7/1988 | Bertram et al. .................... 464/160 X |
| 4,919,244 | * | 4/1990 | Bondioli .............................. 192/56.1 |
| 5,065,639 | * | 11/1991 | Flanhardt et al. .................... 74/417 |
| 5,522,242 | * | 6/1996 | Hauser ............................. 464/160 X |
| 5,829,306 | * | 11/1998 | Komazaki et al. .................... 74/411 |

FOREIGN PATENT DOCUMENTS

| | | |
|---|---|---|
| 44 45 634 C2 | 10/1997 | (DE) . |
| 196 43 559 A1 | 4/1998 | (DE) . |
| 2161244 A | 1/1986 | (GB) . |

* cited by examiner

*Primary Examiner*—Allan D. Herrmann
(74) *Attorney, Agent, or Firm*—Harness, Dickey & Pierce, P.L.C.

(57) ABSTRACT

A drive (1) for driving, or drives in, agricultural implements, has a drive housing (2) with a first shaft (7) which is rotatably supported around a first axis of rotation (4) in the drive housing (2). A first shaft end (10) of the first shaft (7) projects from the drive housing (2). A first gear (13) is arranged on the first shaft (7). The first gear (13) is axially fixed and rotatable, to a limited extent, relative to the first shaft (7). A second shaft (24) is rotatably supported around a second axis of rotation (20) in the drive housing (2). A first shaft end (27) of the second shaft (24) projects from the drive housing (2). A second gear (29) is firmly connected to the second shaft (24) in the axial direction and in the direction of rotation. The first gear (13) and the second gear (29) engage one another. The selected assembly enables a limited amount of rotation of the first shaft (7), with the second shaft (24) being stationary. The first shaft end (10) includes a multi-spline profile and is connected to a driveshaft. Tractors ordinarily include a multi-splined power take-off shaft. The teeth of the power take-off shaft are aligned with gaps of the connecting bore of the driveshaft in such a way as to permit an easy sliding-on and coupling operation.

8 Claims, 1 Drawing Sheet

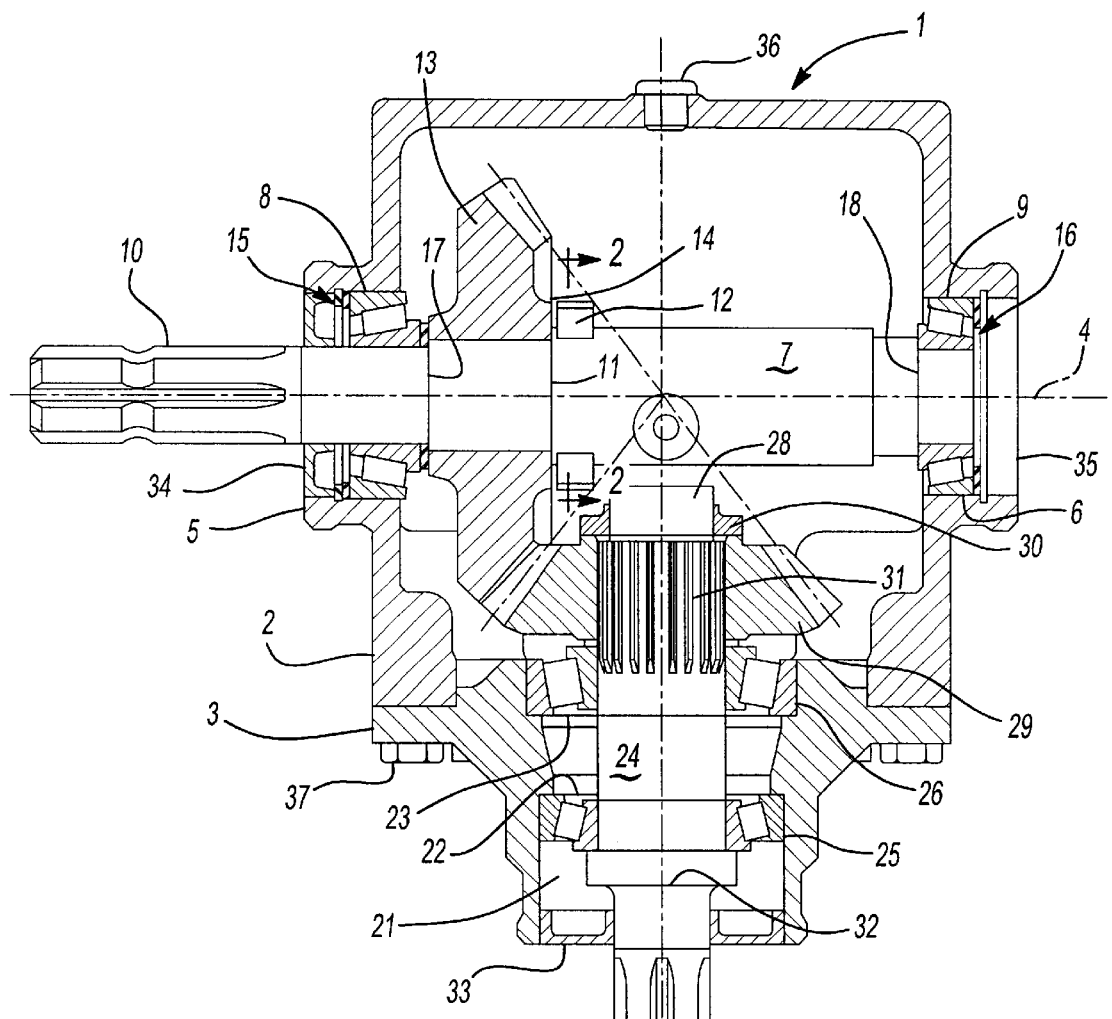
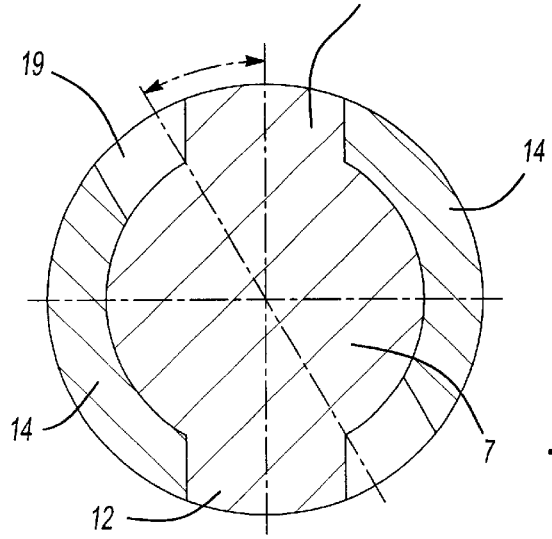

ANGLE DRIVE HAVING AN INTEGRATED COUPLING WITH ROTATIONAL PLAY

BACKGROUND OF THE INVENTION

The invention relates to a drive for driving, or drives in, agricultural implements. The drive includes a drive housing with a first shaft rotatably supported around a first axis of rotation in the drive housing. One shaft end projects from the drive housing. The shaft also carries a first gear. A second shaft is rotatably supported around a second axis of rotation in the drive housing. One shaft end of the second shaft projects from the drive housing and the other end carries a second gear. The first gear and the second gear engage one another.

DE 196 43 559 A1 discloses an angle drive, especially for driving or drives in agricultural implements. Here, two bevel gears are arranged on two axes of rotation which are positioned perpendicularly relative to one another. The shafts intersect one another, with the bevel gears engaging one another and being enclosed by a drive housing.

DE 44 45 634 C2 describes a coupling which serves to establish a driving connection in agricultural implement drives. The coupling transmits torque. A coupling hub and a coupling sleeve are designed to freely rotate relative to one another over a limited angle of rotation. Thus, a driveshaft, which is to be connected to the power take-off shaft of a tractor to establish a driving connection with an agricultural implement, is easily coupled by means of its connecting means to the power take-off shaft.

SUMMARY OF THE INVENTION

It is an object of the present invention to provide a drive which, when used in an agricultural implement driveline, facilitates the coupling operation. The drive achieves a driving connection with the tractor or individual drive parts with the main drive.

In accordance with the invention, the drive includes a drive housing, with a first shaft. The first shaft is rotatably supported around a first axis of rotation in the drive housing. A first gear is arranged on the first shaft to be axially fixed and rotatable relative thereto to a limited extent. A second shaft is rotatably supported around a second axis of rotation in the drive housing. The second shaft end projects from the drive housings. A second gear is firmly connected to the second shaft in the axial direction and in the direction of rotation. The first gear and the second gear engage one another.

An advantage of this embodiment, which includes connecting means with rotational play integrated into the drive, is the elimination of a connecting means with rotational play arranged in front of the drive. The input shaft and the output shaft of the drive are freely rotatable relative to one another over a limited angle of rotation. Thus, the components of the driving connecting means, which can be moved into corresponding positions relative to one another, are rotatable relative to one another to such an extent that the coupling means easily engage. A journal with a multi-spline profile and a correspondingly shaped bore, with the teeth and gaps aligned relative to one another, enable sliding-on and thus an easy coupling operation. The magnitude of the pitch differences can be selected such that a sufficiently large angle of rotation is available. Thus, with the output shaft of the drive being in a fixed position, a tooth of the driven drive journal coincides, by one pitch, with a gap of the splines of a typical driveshaft, which is standardized for power take-off shaft drives.

Furthermore, a coupling with rotational play integrated into the drive can also be inserted into a driveline of an agricultural implement to enable a slight relative rotation of a driveshaft between an auxiliary drive and a main drive. In the case of implements having driven portions which can be folded into a position of rest while the implement is driven on a road, this measure can facilitate the operation of coupling the implement into the operating position.

According to a further embodiment, the first gear is axially fixed between a first shaft shoulder associated with the first shaft and a first bearing.

According to yet a further embodiment, on one end face, the first gear has at least two axially directed claws. The first shaft includes at least two radial projections. The projections engage the recesses between the claws, with rotational play. This design measure permits a limited rotational movement of the first gear relative to the first shaft.

In a preferred embodiment, the axially directed claws are provided at the end face of the first gear. The end faces the first shaft shoulder. The radial projections of the first shaft are arranged to directly adjoin the first shaft shoulder.

The second gear is preferably axially held between a bearing and a securing nut connected to the second shaft. In the direction of rotation, the second gear is form-fittingly connected to the second shaft. This assembly enables any axial forces acting on the second gear to be transmitted to the second shaft. Furthermore, torque can be transmitted from the second gear to the second shaft.

The invention is preferably used in bevel gear drives. Thus, the first gear and the second gear are designed as bevel gears.

In yet a further embodiment, the first axis of rotation and the second axis of rotation extend at right angles relative to one another and intersect one another.

Finally, it is proposed that the first shaft serves as an input shaft and the second shaft as an output shaft. The input shaft, together with a driveshaft, can serve to be connected to the power take-off shaft of a tractor. The output shaft serves to drive the tools of an agricultural implement.

From the following detailed description, taken in conjunction with the accompanying drawings and subjoined claims, other objects and advantages of the present invention will become apparent to those skilled in the art.

BRIEF DESCRIPTION OF THE DRAWINGS

FIG. 1 is a longitudinal section view through an angle drive having an integrated coupling with rotational play in accordance with the present invention.

FIG. 2 is a cross-section view through the coupling according to FIG. 1 along line 2—2 thereof.

DETAILED DESCRIPTION OF THE PREFERRED EMBODIMENT

FIG. 1 illustrates a drive 1 with an integrated coupling with rotational play. The drive 1 includes a drive housing 2 with a flanged-on housing portion 3. The drive housing 2 has a first bearing bore 5 and a second bearing bore 6. The bearing bores 5, 6 are centered on a first axis of rotation 4 and are arranged on opposite sides of the drive housing 2. The drive housing 2 has a first shaft 7 centered on the first axis of rotation 4 and supported in the two bearing bores 5, 6 by two rolling contact bearings 8, 9. The first shaft 7 has a journal-like first shaft end 10 projecting from the drive housing 2. A first shaft shoulder 11 and two radial projections 12, which immediately adjoin the first shaft shoulder 11, are likewise on the first shaft 7.

A first bevel gear 13, on its end face facing the first shaft shoulder 11, includes two axially extending claws 14. The radial projections 12 engage the recesses 19 between the claws 14 with rotational play. The first gear 13 is supported between the inner race of the first rolling contact bearing 8 and the first shaft shoulder 11 of the first shaft 7. Thus, the first gear 1 3 is axially fixed and rotatable, to a limited extent, relative to the first shaft 7.

The outer race of the first rolling contact bearing 8 is supported against a first securing ring 15. The first securing ring 15 is accommodated in a groove in the first bearing bore 5. The outer race of the second rolling contact bearing 9 is supported against a second securing ring 16. The second securing ring 16 is accommodated in a groove in the second bearing bore 6. The inner race of the first rolling contact bearing 8 is supported against a second shaft shoulder 17 of the first shaft 7. The inner race of the second rolling contact bearing 9 is supported against a third shaft shoulder 18 of the first shaft 7. The first shaft 7 is thus supported so as to be axially fixed. Any axial forces transmitted to the first shaft 7 are accommodated by the two rolling contact bearings 8, 9.

The flanged-on housing portion 3 includes an oblong bore 21 arranged and centered on a second axis of rotation 20. The oblong bore 21 has a first step 22 and a second step 23. The flanged-on housing portion 3 also receives a second shaft 24. The second shaft 24 is centered on the second axis of rotation 20. The second shaft 24 is supported in the oblong bore 21 by a third rolling contact bearing 25 and a fourth rolling contact bearing 26.

The second shaft 24 includes a journal-like first shaft end 27 projecting from the flanged-on housing portion 3. A second shaft end 28 includes a second bevel gear 29. The second bevel gear 29 is clamped in the axial direction between the inner race of the fourth rolling contact bearing 26 and a securing nut 30 threaded onto the second shaft end 28 of the second shaft 24. The bevel gear 29 is held by a set of teeth 31 so as to be rotationally fast relative to the second shaft 24. The outer race of the third rolling contact bearing is supported on the first step 22 of the bore 21 to rest against a shoulder. The inner race of the third rolling contact bearing 25 is supported against a first shaft shoulder 32 of the second shaft 24. The second shaft 24 is thus firmly supported in the axial direction. Any axial forces transmitted to the second shaft 24 are accommodated by the two rolling contact bearings 25, 26.

The drive housing 2 and the housing portion 3 are connected to one another by bolts. Accordingly, the first axis of rotation 4 and the second axis of rotation 20 extend at right angles relative to one another and intersect one another. Furthermore, the first bevel gear 13 and the second bevel gear 29 engage one another inside the drive housing 2.

The drive 1 has annular apertures between the first shaft 7 and the bearing bores 5, 6 and between the second shaft 24 and the oblong bore 21. The annular apertures are outwardly sealed by seals 33, 34. The seals 33, 34 are in the form of radial shaft sealing rings. The rings are positioned between the first shaft 7 and the bearing bore 5 and between the second shaft 24 and the oblong bore 21. Furthermore, the second bearing bore 6 is outwardly sealed by a cover 35. In this way, lubricating oil is prevented from escaping from the drive 1. Also, dirt is prevented from entering the drive 1. In order to replace the drive oil, an oil outlet screw 36 is provided.

While the above detailed description describes the preferred embodiment of the present invention, the invention is susceptible to modification, variation and alteration without deviating from the scope and fair meaning of the subjoined claims.

What is claimed is:

1. A drive for driving agricultural implements, comprising:
    a drive housing;
    a first shaft rotatably supported around a first axis of rotation in the drive housing, a first shaft end of said first shaft projecting from the drive housing;
    a first gear arranged on the first shaft, said first gear being axially fixed and freely rotatable to a limited extent without resistance relative to said first shaft such that the first gear is prohibited from continuous rotation about said first shaft;
    a second shaft rotatably supported around a second axis of rotation in the drive housing, a first shaft end of said second shaft projecting from the drive housing;
    a second gear firmly connected to the second shaft in axial and rotational directions, said first gear and second gear engaging one another.

2. A drive according to claim 1, wherein the first gear being axially fixed between a first shaft shoulder associated with the first shaft and a first bearing.

3. A drive according to claim 1, wherein on one end face, the first gear including at least two axially directed claws and the first shaft includes at least two radial projections, with the projections engaging recesses between the claws with rotational play.

4. A drive according to claim 3, wherein the axially directed claws are provided at the end face of the first gear, said end face faces the first shaft shoulder, and the radial projections of the first shaft being arranged so as to directly adjoin the first shaft shoulder.

5. A drive according to claim 1, wherein the second gear is axially held between a third bearing and a securing nut connected to the second shaft and, in the direction of rotation, is form-fittingly connected to the second shaft.

6. A drive according to claim 1, wherein the first gear and the second gear are bevel gears.

7. A drive according to claim 1, wherein the first axis of rotation and the second axis of rotation extend at right angles relative to one another and intersect one another.

8. A drive according to claim 1, wherein the first shaft serves as an input shaft and the second shaft as an output shaft.

* * * * *